United States Patent [19]

Bachmann et al.

[11] Patent Number: 5,131,825
[45] Date of Patent: Jul. 21, 1992

[54] MULTI-STAGE VACUUM PUMP WITH REACTION CHAMBER BETWEEN STAGES

[75] Inventors: Paul Bachmann, Cologne; Lothar Brenner, Münstereifel; Hartmut Kriehn; Monika Kuhn, both of Cologne, all of Fed. Rep. of Germany

[73] Assignee: Leybold Aktiengesellschaft, Hanau, Fed. Rep. of Germany

[21] Appl. No.: 659,587

[22] Filed: Feb. 22, 1991

[30] Foreign Application Priority Data

Mar. 27, 1990 [EP] European Pat. Off. ........ 90105783.6

[51] Int. Cl.⁵ .............................................. F04C 29/10
[52] U.S. Cl. ......................................... 418/001; 418/9; 418/47; 418/206; 417/243
[58] Field of Search ............... 417/205, 245, 246, 247, 417/249, 313, 243; 418/15, 47, 206, 9, 1

[56] References Cited

U.S. PATENT DOCUMENTS

| | | | |
|---|---|---|---|
| 1,769,153 | 9/1930 | Meyer | 418/47 |
| 4,066,386 | 1/1978 | Johnson et al. | 417/245 |
| 4,087,197 | 5/1978 | Haugen | 417/243 |
| 4,789,314 | 12/1988 | Higuchi et al. | 417/243 |
| 4,850,827 | 7/1989 | Eiermann | 418/94 |
| 4,943,215 | 7/1990 | Berges | 418/9 |

FOREIGN PATENT DOCUMENTS

| | | | |
|---|---|---|---|
| 2642479 | 8/1990 | France | 417/243 |
| 59-229072 | 12/1984 | Japan | 417/245 |
| 61-197793 | 9/1986 | Japan | 417/243 |
| 62-107287 | 5/1987 | Japan | 417/243 |

Primary Examiner—Richard A. Bertsch
Assistant Examiner—David L. Cavanaugh
Attorney, Agent, or Firm—Felfe & Lynch

[57] ABSTRACT

The invention relates to a method for the operation of a multi-stage, dry compression vacuum pump (1) with an inlet (7) and an outlet (9), in which the aspirated gases contain gaseous components which endanger the operation of the vacuum pump; in order to render the gas components harmless it is proposed that the gases aspirated from the vacuum chamber (8) and flowing through the vacuum pump be carried through a reaction chamber (14) in which the components endangering the vacuum pump are chemically or physically treated at a pressure between the aspiration pressure and the outlet pressure of the vacuum pump.

11 Claims, 2 Drawing Sheets

MULTI-STAGE VACUUM PUMP WITH REACTION CHAMBER BETWEEN STAGES

BACKGROUND OF THE INVENTION

The invention related to a method of operation of multistage, dry compression vacuum pump with an inlet and an outlet, in which the aspirated gases contain gaseous components which are hazardous to the operation of the vacuum pump. Furthermore, the invention relates to a vacuum pump suitable for the practice of this method.

Multi-stage dry compression vacuum pumps are disclosed in German patent disclosure documents 31 47 824 (G.B. 2,088,957) and 32 44 099 (U.S. Pat. No. 4,504,201). If pumps of this or a similar kind are used alone or in combination with an additional vacuum pump, such as a high-vacuum pump for example, for the evacuation of chambers in which etching, coating or other vacuum treatment or vacuum manufacturing processes are performed, it often happens that solids enter into the pump. These lead to the formation of coatings in dry compression vacuum pumps with small slits, resulting in abrasions, loss of clearances, and thus in greater wear phenomena. These result in shorter useful vacuum pump life.

The formation and deposition of solids can take place on account of chemical inter-reactions of components of the gases being exhausted, reactions of gas components with the surfaces, and/or catalytic effects. In addition to such chemical reactions, the formation of solids can also result from aggregation state changes resulting from a pressure rise or from cooling.

European patent application 332,741 (U.S. Pat. No. 4,943,215) has disclosed providing an access from the exterior to a passage connecting together two stages of a multi-stage vacuum pump of the kind here in question, to permit inspecting for contamination and removing it. These measures are limited only to the connecting passage itself, i.e., one can neither examine for coatings occurring in the pump chambers and/or on the rotors or remove such coatings.

SUMMARY OF THE INVENTION

The present invention is addressed to the problem of creating a method for operating a vacuum pump of the kind described above, in which trouble arising from the formation of coatings is avoided.

This problem is solved in accordance with the invention in that the aspirated gases flowing through the vacuum pump are carried through a reaction chamber in which the components endangering the vacuum pump are treated chemically or physically at a pressure between the aspirating pressure and the discharge pressure.

The present invention sets out from the knowledge that a chemical or physical treatment of the vapors being sucked from a vacuum chamber before the entry of the gases into the vacuum pump (i.e., at the inlet pressure), for the purpose of rendering harmless the components endangering the pump, can be accomplished only with difficulty. Under the pressure conditions prevailing in the inlet part of the vacuum pump, the necessary reactions occur but very slowly, unless extreme conditions are created, such as very high temperatures, long detention times or highly reactive reagents, by means of which the reactions are influenced. Such measures are complex and costly. Furthermore, they can have negative effects on safety of operation and on the suction capacity of the vacuum pump. Furthermore, undesired secondary chemical reactions are possible.

Since the treatment of the gas components endangering the vacuum pump takes place at a higher pressure than the suction pressure, the reactions which are needed to eliminate gas components or render them harmless take place more rapidly. In multi-stage pumps a definite pressure increase takes place from one stage to the next stage. This fact can even be exploited for the purpose of causing a reaction to take place under optimum pressure conditions.

DETAILED EMBODIMENTS

Figure 1:
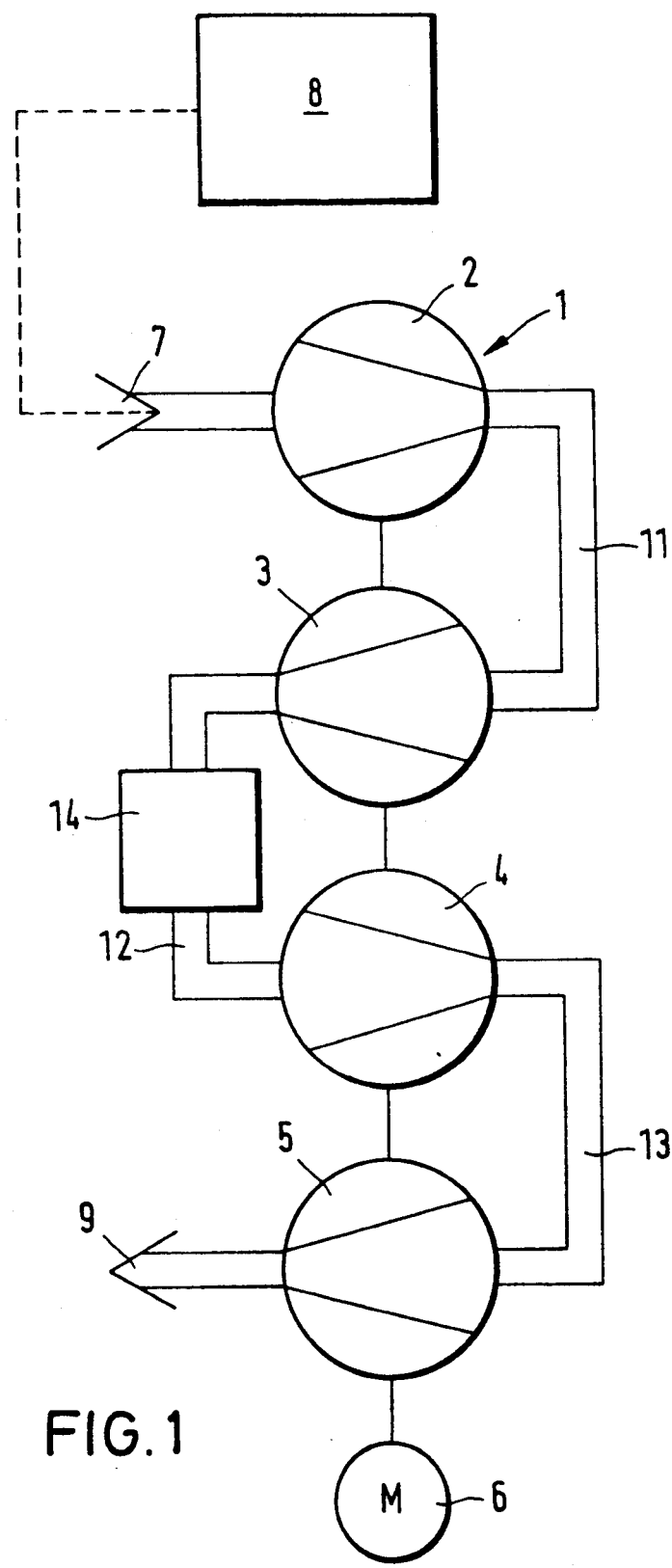
FIG. 1 is a diagram of a multi-stage vacuum pump with a reactor according to the invention.

The vacuum pump 1 in FIG. 1 has four stages 2 to 5. The rotors within the stages are driven by a common motor 6. The inlet 7 of the first stage 2 of the vacuum pump is connected to a component represented as a block 8. This component 8 can be, for example, a high-vacuum pump, a separator, filter, condenser or even the vacuum chamber itself in which a vacuum treatment or vacuum manufacturing process is being performed. Usually the vacuum pump 1 pumps against atmospheric pressure.

The individual stages 2 to 5 of the vacuum pump 1 are connected to one another by lines 11, 12 and 13. In these embodiments a reaction chamber 14 is situated between the pump stages 3 and 4. This reaction chamber 14 has the purpose of rendering harmless any gas components which are drawn into pump 1 with the aspirated gases and which may endanger the operation of the vacuum pump, so that abrasions, losses of clearance, corrosion or the like in the pump stages 4 and 5 following the reaction chamber 14 are prevented.

Figure 2:
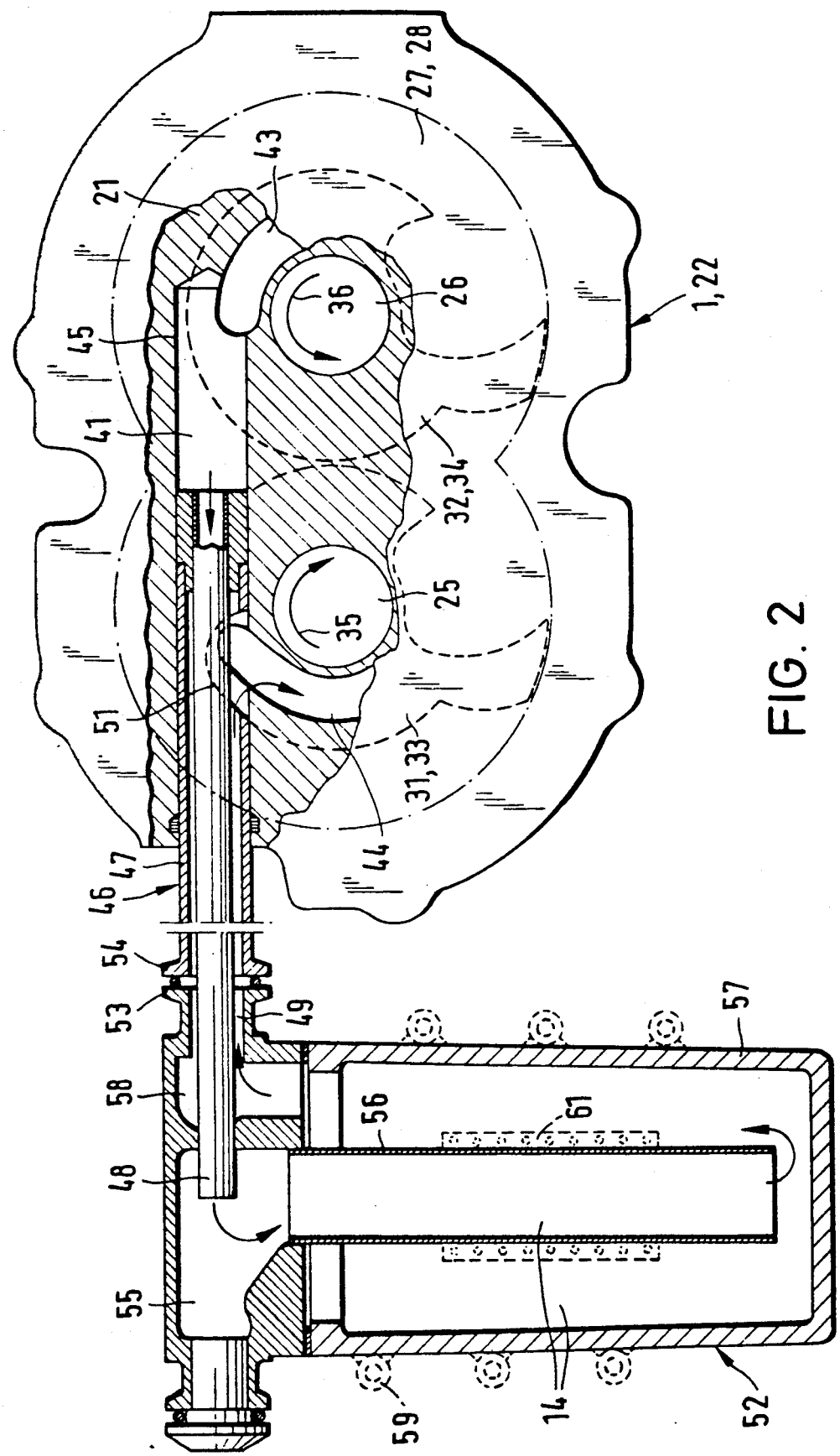
FIG. 2 is a partial section through the bearing plate of a claw rotor pump as well as through a reactor connecting together two stages of this claw rotor pump.

FIG. 2 shows a partial section through a bearing plate 21 of a double-shaft vacuum pump 22 whose shafts are identified as 25 and 26. The bearing plate 21 serves to separate two pump chambers 27 and 28 which are situated beside, above and below, the bearing plate 21. The shape of the pump chambers 27 and 28 is represented in dash-dotted lines. In each of these pump chambers 27 and 28 there is a pair of rotors 31, 32 and 33, 34, respectively, whose outlines are represented in broken lines. The shafts 25 and 26 bearing the rotors pass through the bearing plate 21. Their sense of rotation is indicated by the arrows 35 and 36.

To enable the pumped medium to pass from the inlet-end pump chamber to the outlet-end pump chamber the connecting passage 41 is provided. This connects the outlet slot 43, situated at the front side of the inlet-end pump chamber, to the inlet slot 44, situated at the front side of the outlet-end pump chamber. Outlet 43 of the inlet-end pump chamber and inlet 44 of the outlet-end pump chamber are formed by arcuate openings in the disk 16. The passage 41 is formed by a blind hole 45 in the bearing plate 21, which intersects the outlet 43 and the inlet 44 and thus connects them to one another.

To be able to arrange a reaction chamber 14 between the outlet 43 of the inlet-end pump chamber and the inlet 44 of the outlet-end pump chamber, a duplex tube system 46 is situated in bore 45, and has in the embodiment here represented an outer tube 47 and a tube 48 disposed concentrically within it. The annular space 49 formed by the tube 47 and the tube 48 is closed in the area of the end of the duplex tube system that is inserted into the bore 45, so that the gases issuing from the outlet 43 will enter into the tube 48. By means of the tube 48 these gases ar fed to the reaction chamber 14. The gases leaving the reaction chamber 14 pass into the annular space 49 and are carried to the inlet 44 of the next stage. For this purpose the outer tube 47 of the duplex tube system has at the level of inlet 44 an opening 51 so that the gases treated in the reaction chamber 14 can pas into the forepump chamber.

The reaction chamber 14 is situated in an external reactor 52 which is removably joined to the duplex tube system 46, to the tube 47 thereof. For this purpose the reactor 52 and the tube 47 are provided with flanges 53 and 54.

The reactor 52 has an inlet chamber 55 into which the inner tube 48 leads. The inlet chamber 55 is followed by an open-bottomed tube section 56 extending down to the bottom area. The interior of this tube section 56 and the annular space between this tube section 56 and the outer case 57 of the reactor 52 form the reactor chamber 14 in which the desired reactions of the gas components endangering the operation of the vacuum pump are to be brought about. The annular chamber adjoins an outlet chamber 58 which is in communication with the annular space 49 of the duplex tube system 46 and thus with the inlet 44 of the next stage of the vacuum pump.

The treatment of the gases flowing through the reactor chamber 14 can be performed by controlling their temperature. This can be accomplished, for example, by means of a cooling or heating coil 59 mounted on the housing 57 of the reactor 52 or a heating jacket 61 provided on the central tube 61 (both represented in broken lines). Other treatments (adsorption, neutralization, catalysis or the like) can be performed with materials placed in the reaction chamber 14.

EXAMPLE 1

Treatment of the gases by cooling to achieve desublimation: In the etching of aluminum or other metals and in the deposition of silicon compounds in CVD processes, chlorides and fluorides are produced as processes gases. These salts form solids at higher pressure and low temperatures. By cooling the reactor 14 separation can be made to take place at this point; the solids can be retained in filter materials situated in the reactor chamber 14.

EXAMPLE 2

Adsorption of gases: In pumping out corrosive gases, such as HCl, HF, $SiH_2$ and $Cl_2$, solid corrosion products can form in the pump. These gases can be bound onto active carbon, zeolites or aluminum oxide placed in the reactor chamber 14.

EXAMPLE 3

Chemical reaction: In the manufacture of incandescent lamps mercury vapors are produced which have to be pumped away. To prevent condensation in the pump the mercury can be removed from the gas stream by chemical reaction with iodized charcoal or zinc dust.

EXAMPLE 4

Reduction of gases on metals: Hydrogen halide can be reacted on base metals, such as iron, to form metal halide by redox reactions. The metal is best put into the reaction chamber 14 in the form of chips.

EXAMPLE 5

Treatment by pyrolysis: Metal compounds such as hydrides, halides, carbonyl compounds or organometallic compounds can be deposited in metal form in the reactor 14 by means of a thermal reaction. The reaction is promoted by the presence of free metal surfaces and is best performed at a pressure of 200 mbar.

EXAMPLE 6

Neutralization of gases: Aspirated traces of halogen hydrides, such form for example in plasma etching processes using $CF_4$ in the cleaning of circuit boards, can be neutralized by using ion exchangers or metal oxides.

We claim:

1. Apparatus for the evacuation of a vacuum chamber in which reactive gaseous components are present, comprising
   a dry compression vacuum pump having a plurality of stages to aspirate said vacuum chamber, each stage having an inlet and an outlet, and
   a reaction chamber between the outlet of one pump stage and the inlet of the next pump stage, said reaction chamber having means for causing chemical reaction of said reactive gaseous components.

2. Apparatus as in claim 1 wherein said reaction chamber is situated in a reactor separate from said vacuum pump.

3. Apparatus as in claim 2 wherein said reactor is connected to said vacuum pump by a duplex tube system.

4. Apparatus as in claim 3 wherein said duplex tube system comprises an outer tube and an inner tube located in said outer tube.

5. Apparatus as in claim 2 further comprising heating means associated with said reactor.

6. Apparatus as in claim 2 further comprising cooling means associated with said reactor.

7. Apparatus as in claim 1 wherein said vacuum pump is configured as a double shaft vacuum pump having two rotors in each stage on common shafts with two rotors in the next stage, said stages being connected by channel means interrupted by said reaction chamber.

8. Apparatus as in claim 1 wherein said stages are separated by a bearing plate having an outlet slot facing one stage, in inlet slot facing the next stage, and a duplex tube system comprising an outer tube connected to said first slot and an inner tube connected to said second slot, said reaction chamber having an inlet fed by said inner tube and an outlet which feeds said outer tube.

9. Method for the evacuation of a vacuum chamber in which reactive gaseous components are present, comprising
   aspirating said chamber using a dry compression vacuum pump having a plurality of stages, each stage having an inlet and an outlet, and
   causing a chemical reaction of said reactive gaseous components at an increased pressure relative to said vacuum chamber by providing a reaction chamber between the outlet of one said pump stage and the inlet of the next said pump stage.

10. Method as in claim 9 wherein said chemical reaction forms products which are retained in said reaction chamber.

11. Method as in claim 10 wherein said products are solids.

* * * * *